(12) United States Patent
Dugerie et al.

(10) Patent No.: US 9,067,670 B2
(45) Date of Patent: Jun. 30, 2015

(54) FRAME FOR AN OPENING PROVIDED IN AN AIRCRAFT FUSELAGE

(75) Inventors: Marc Dugerie, Encausse (FR);
Guillaume Gallant, Lareole (FR);
Romain Delahaye, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 10 days.

(21) Appl. No.: 13/380,704

(22) PCT Filed: Jun. 25, 2010

(86) PCT No.: PCT/FR2010/051317
§ 371 (c)(1),
(2), (4) Date: May 4, 2012

(87) PCT Pub. No.: WO2011/001081
PCT Pub. Date: Jan. 6, 2011

(65) Prior Publication Data
US 2012/0211602 A1    Aug. 23, 2012

(30) Foreign Application Priority Data
Jun. 29, 2009 (FR) .................................. 09 54407

(51) Int. Cl.
*B64C 1/00* (2006.01)
*B64C 1/14* (2006.01)

(52) U.S. Cl.
CPC .................................. *B64C 1/1461* (2013.01)

(58) Field of Classification Search
CPC ............................. B64C 1/061; B64C 1/1407
USPC ............... 244/119, 129.5, 120, 129.4, 123.7; 52/204.1, 210; 49/504
See application file for complete search history.

(56) References Cited

U.S. PATENT DOCUMENTS

| | | | | |
|---|---|---|---|---|
| 4,557,440 A | * | 12/1985 | Adams | 244/129.4 |
| 5,241,725 A | * | 9/1993 | Hamatani et al. | 16/82 |
| 5,931,415 A | * | 8/1999 | Lingard et al. | 244/129.5 |
| 6,375,121 B1 | * | 4/2002 | Porte et al. | 244/129.4 |
| 2002/0000494 A1 | * | 1/2002 | Bold et al. | 244/129.5 |

(Continued)

FOREIGN PATENT DOCUMENTS

| | | |
|---|---|---|
| FR | 2 905 669A A1 | 3/2008 |
| WO | 03/104080 A1 | 12/2003 |
| WO | 2008/015360 A1 | 2/2008 |

OTHER PUBLICATIONS

International Search Report, dated May 11, 2011, from corresponding PCT application.

*Primary Examiner* — Brian M O'Hara
*Assistant Examiner* — Jessica Wong
(74) *Attorney, Agent, or Firm* — Young & Thompson

(57) ABSTRACT

A door frame is provided at an opening made in a fuselage of an aircraft that is delimited by a skin. The frame includes an upper longitudinal stiffener and a lower longitudinal stiffener and two vertical substructures, each arranged on one side of the opening, connected by the upper and lower longitudinal stiffeners. The frame also comprises at least one stop provided at the level of the opening that uptakes radial forces exerted by the door. Each vertical substructure comprises at least three walls made of composite material that are connected to one another to form a box substructure having a closed and hollow cross-section in a sectional plane perpendicular to an axis of the length of the vertical substructure.

14 Claims, 4 Drawing Sheets

(56) References Cited

U.S. PATENT DOCUMENTS

| | | |
|---|---|---|
| 2004/0123551 A1 | 7/2004 | Liang et al. |
| 2005/0178078 A1* | 8/2005 | Valentz et al. ............... 52/200 |
| 2008/0073931 A1 | 3/2008 | Mahieu et al. |
| 2008/0179460 A1* | 7/2008 | Rodriguez et al. ........... 244/119 |
| 2009/0146008 A1 | 6/2009 | Thiele |
| 2009/0308977 A1 | 12/2009 | Larcher |
| 2010/0275537 A1* | 11/2010 | Valentz et al. ............... 52/200 |
| 2010/0294888 A1* | 11/2010 | Texcier et al. ............. 244/129.5 |
| 2011/0253834 A1* | 10/2011 | Carter et al. ............... 244/118.3 |
| 2013/0075528 A1* | 3/2013 | Paul ........................... 244/129.5 |

\* cited by examiner

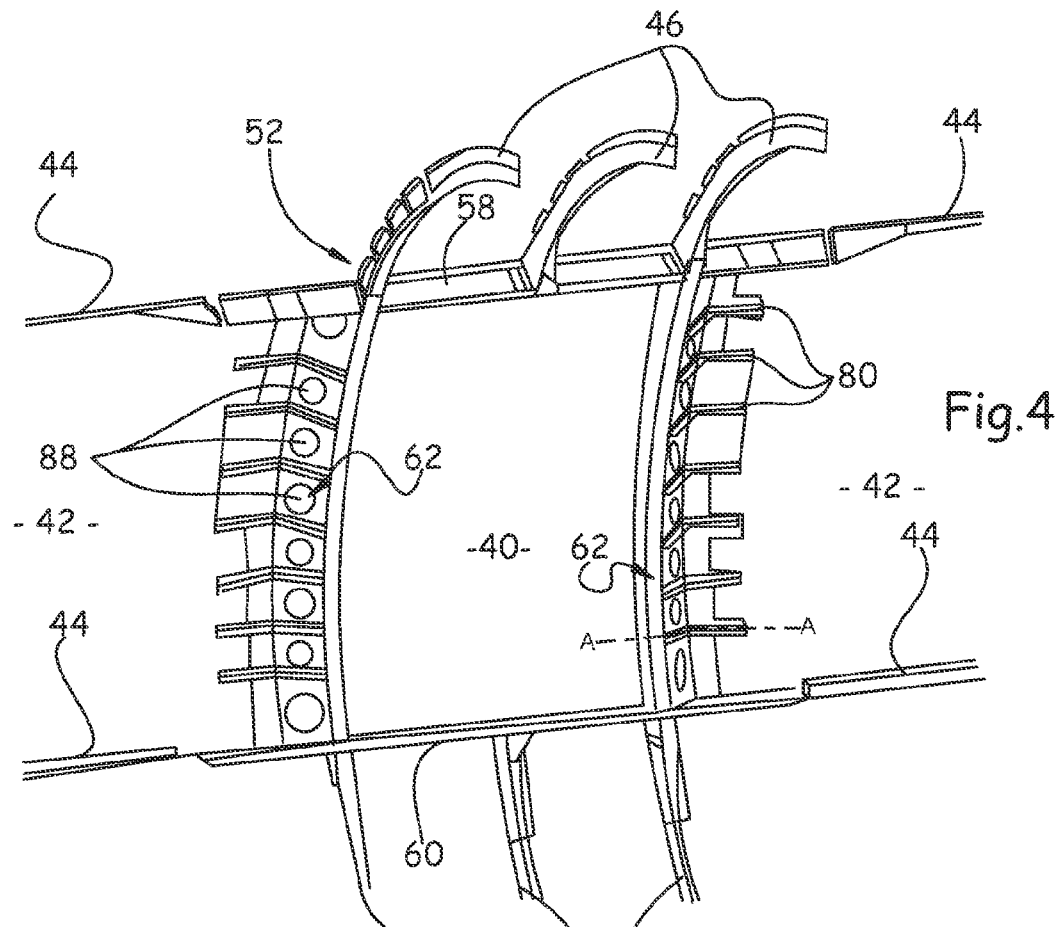
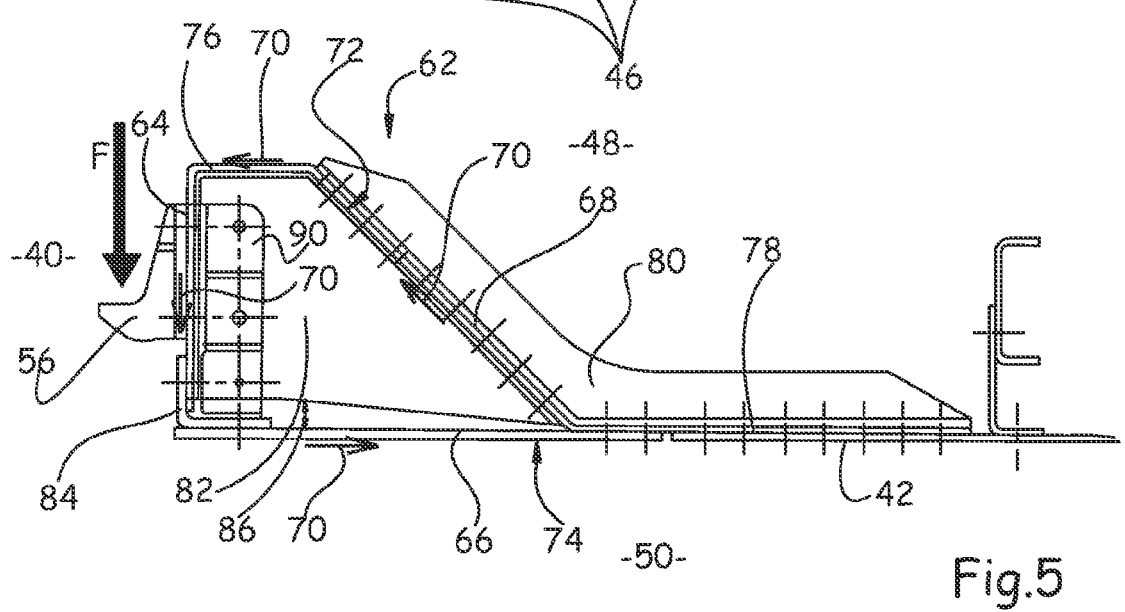
Fig.4
Fig.5

FRAME FOR AN OPENING PROVIDED IN AN AIRCRAFT FUSELAGE

BACKGROUND OF THE INVENTION

This invention relates to a frame for an opening provided in an aircraft fuselage.

FIGS. 1 to 3 show by way of example the front of an aircraft 10 that comprises a fuselage 12 in which an opening 14 is made that makes it possible, for example, for passengers to pass, and said opening that separates the outside of the aircraft 16 from the interior environment 18 is able to be sealed by a door called a passenger door.

In a known manner, the fuselage of an aircraft comprises a skin 20 that is reinforced by a structure that comprises in particular a first series of longitudinal stiffeners (stringers) and a second series of transverse stiffeners (frames).

To provide the uptake of forces between the structure of the door and the structure of the fuselage, a door frame 22 is provided around the opening 14.

At the door frame 22, a passenger door induces primarily radial forces that are oriented toward the outside of the aircraft (indicated by the arrow F in FIG. 3); said forces are taken up by stops 24 provided at the frame 22.

For taking up such a type of force, the frame 22 comprises, on the one hand, an edge frame that comprises an upper longitudinal stiffener called a lintel 26, a lower longitudinal stiffener called a threshold 28, vertical stiffeners 30 on both sides of the opening 14, and, on the other hand, a secondary frame that consists of at least two vertical stiffeners 32 that are arranged on both sides of the opening at a certain distance and two upper and lower longitudinal stiffeners 34 that are distant from the lintel 26 and the threshold 28. Ribs or reinforcements are provided to connect the edge frame and the secondary frame. Thus, the stiffeners 30 and 32 are connected by ribs called intercostal ribs 36 in such a way as to form a ladder-shaped structure on both sides of the opening 12. The document WO03/104080 describes such a ladder-shaped structure.

As illustrated in FIG. 3, the moment generated by the shearing force F that is applied at each stop 24 on the frame 22 is taken up by two opposing reactions, a first reaction R1 at the secondary frame and a second reaction R2 at the edge frame. According to this type of design, the balancing of the forces is done locally opposite each door stop using a corresponding intercostal rib.

The loading of the door frame 22 is not limited to these radial forces. In a general manner, the door frame is to ensure the integrity of the fuselage.

According to a first embodiment, all of the elements that constitute the door frame 22 and the skin of the fuselage are metal, whereby the vertical stiffeners 30 and 32 as well as the intercostal ribs 36 are made from thick panels that are machined in a conventional manner. After machining, these different elements are assembled in such a way as to form the substructures in a ladder, and then the skin is next placed on these thus formed substructures. Starting from a metal skin, this solution has the drawback of comprising numerous attachments and has the advantage of having good control of the thickness and successive deposition planes that are parallel to one another.

So as to reduce the on-board weight of the aircraft, there is a tendency to use composite materials.

A first variant embodiment of a door frame made of composite material consists in making a first subassembly that comprises the edge frame, the secondary frame, and the intercostal ribs. The production of this subassembly in a single piece requires a complex device. Furthermore, the assembly with a composite material skin requires the use of wedges because of the contraction of the skin achieved from pre-impregnated folds that lead to greatly increasing the assembly time.

BRIEF SUMMARY OF THE INVENTION

Another variant embodiment of a door frame made of composite material consists in independently producing all of the elements in composite material and then in assembling them like elements of a metal door frame. However, this solution is not satisfactory because the production of parts made of composite material in an economical manner induces dimensional tolerance problems during the docking of different parts. Finally, the assembly according to the same architecture as the metal parts (edge frame, secondary frame, intercostal ribs) of the elements made of composite material does not make it possible to optimize the uptake of forces because of the poor response of the parts made of composite material to the forces applied outside of the planes of the folds forming said parts.

Also, the purpose of this invention is to eliminate the drawbacks of the prior art by proposing a frame for an opening provided in an aircraft fuselage, whose architecture optimizes the uptake of forces. According to another objective, the architecture should make it possible to simplify the production of the frame in composite material.

For this purpose, the invention has as its object a frame of a door that is provided at an opening made in a fuselage of an aircraft that is delimited by a skin, whereby said frame that comprises an upper longitudinal stiffener and a lower longitudinal stiffener provides the connection between two vertical substructures that are arranged on both sides of the opening, at the level of which there is provided at least one stop that provides the uptake of radial forces exerted by the door, characterized in that each vertical substructure comprises at least three walls made of composite material that are connected to one another to form a closed and hollow profile in such a way as to obtain a box structure.

BRIEF DESCRIPTION OF THE SEVERAL VIEWS OF THE DRAWINGS

Other characteristics and advantages will emerge from the following description of the invention, a description that is provided only by way of example, relative to the accompanying drawings in which:

FIG. 4 is a perspective view from the inside of an aircraft of a door frame according to the invention, FIG. 5 is a cutaway, along line A-A in FIG. 4, of one edge of the door frame that is illustrated in FIG. 4.

DETAILED DESCRIPTION OF THE INVENTION

Figure 1:
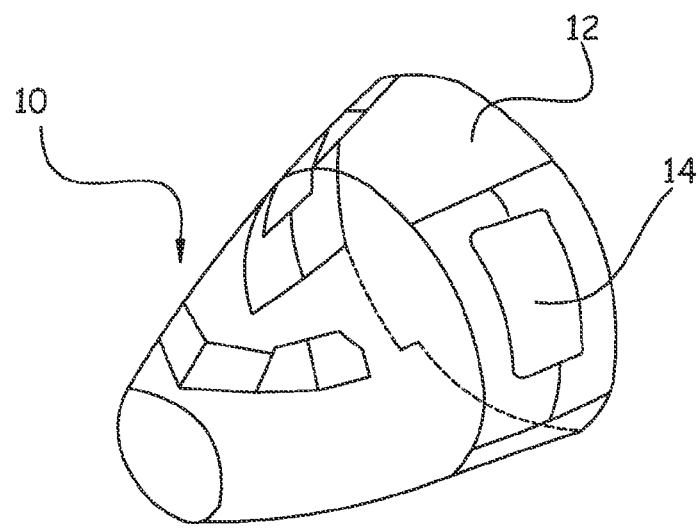
FIG. 1 is a diagrammatic representation of the front of an aircraft.
Figure 2:
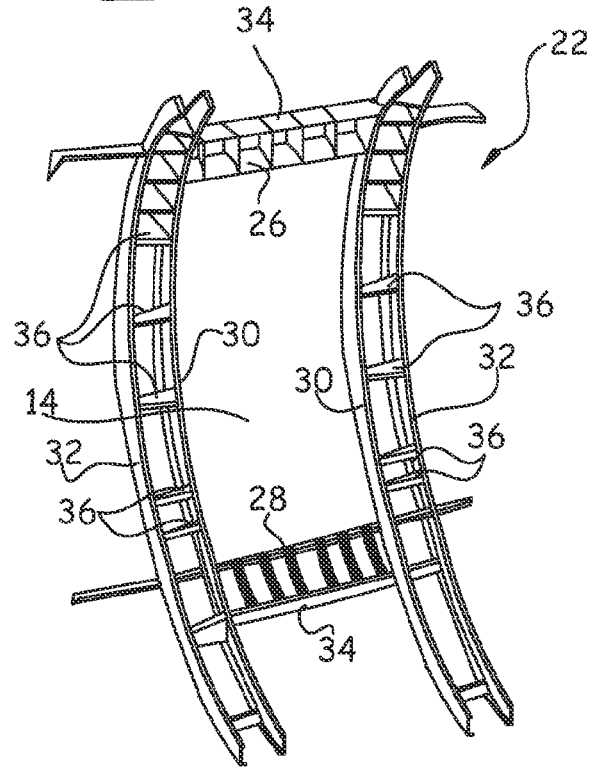
FIG. 2 is a perspective view from the inside of the aircraft of a door frame according to the prior art.
Figure 3:
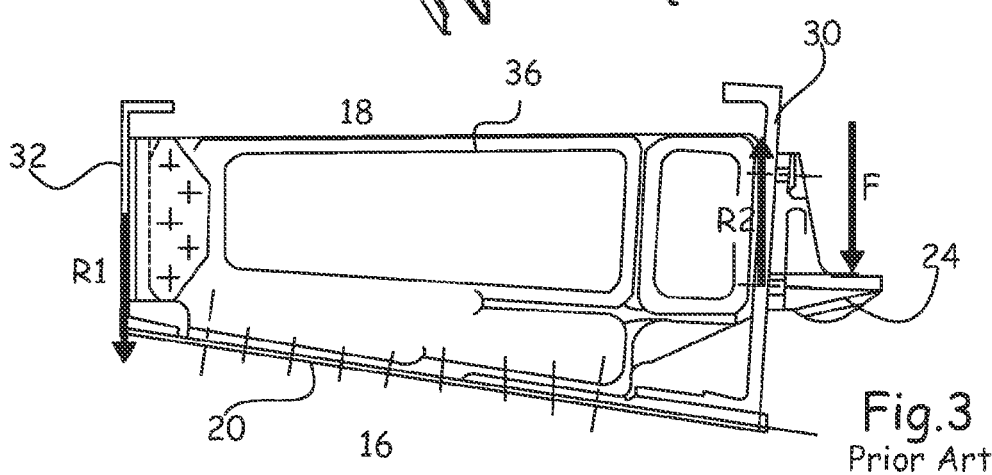
FIG. 3 is a cutaway along a plane that contains an intercostal rib of a door frame according to the prior art.

FIG. 4 shows an aircraft fuselage in which an opening 40 is to be made that is able to be sealed by a door (not shown).

The fuselage comprises a skin 42 that is connected to a structure that consists of stiffeners, in particular a first series of longitudinal reinforcements 44 called stringers and a second series of transverse reinforcements 46 called frames.

The skin 42 makes it possible to isolate the interior of the aircraft referenced 48 from the exterior environment referenced 50, in FIG. 5.

According to a nonlimiting application, this opening 40 makes possible the transfer of passengers from the outside to the inside or vice versa.

To provide in particular the transmission of forces between the door and the structure of the aircraft, the opening 40 is delimited by a frame 52.

The door frame 52 comprises stops 56 against which the door can rest and that provide in particular the uptake of radial forces oriented toward the outside, indicated by the arrow F. These stops are preferably arranged at vertical uprights of the frame.

Hereinafter, the longitudinal axis of the aircraft is defined as the axis that goes from the front to the rear of the aircraft, essentially parallel to the generatrices of the fuselage. Transverse plane is defined as a plane that is perpendicular to the longitudinal axis. A radial direction is contained in a transverse plane and passes through the longitudinal axis. A longitudinal plane is defined as a plane that contains the longitudinal axis and a radial direction.

The door frame 52 comprises an upper longitudinal stiffener 58 that is called a lintel, a lower longitudinal stiffener 60 that is called a threshold, with the lintel 58 and the threshold 60 providing the connection between two vertical substructures 62 that are arranged on both sides of the opening 40. The lintel and the threshold come in the form of ribs arranged in longitudinal planes. These stiffeners 58 and 60 generally have a C-shaped cross-section with a central part that is placed in a longitudinal plane and dropped edges, one of which is in contact with the skin of the aircraft.

These stiffeners 58 and 60 are made of composite material. However, they can be made of another material, for example metal. They are no longer described because they may have different shapes to provide in particular the connection between the vertical substructures 62.

According to the invention, the vertical substructures 62 are made of composite material and do not have a ladder-shaped architecture as for the prior art but rather a box architecture.

A box architecture is defined as a substructure 62 that comprises at least three walls that are connected to one another in such a way as to form a closed and hollow profile.

For this purpose, as illustrated in FIG. 5, a substructure 62 comprises a first wall 64 that is arranged at the edge of the opening, a second wall 66 that is arranged essentially perpendicular to the first wall 64, in the plane of the skin of the aircraft once the frame is connected to the fuselage, whereby said second wall 66 is connected and adjacent to the first wall 64, and a third inclined wall 68 that connects the end of the first wall 64 that is oriented toward the inside and the end of the second wall 66 that is removed from the edge of the opening in such a way as to obtain a box shape.

As illustrated in FIG. 5, the box shape makes it possible to balance the moments created by the forces of the stops by torsion loading of this box shape, indicated by the arrows 70. The torsion stream creates shearing forces at the box substructures 62, which are more conducive to a production of composite materials than the ladder structures of the prior art because the forces are still in the plane of walls that are produced in the general form of stratified elements.

According to another aspect, these torsion streams that are generated in the substructures 62 are balanced at their junction zones with the lintel 58 and the threshold 60.

According to one embodiment, each substructure 62 comprises a first part 72 that comprises the first wall 64 and the inclined wall 68 and a second part 74 that comprises the second wall 66 and that forms a part of the skin of the fuselage.

Figure 6:
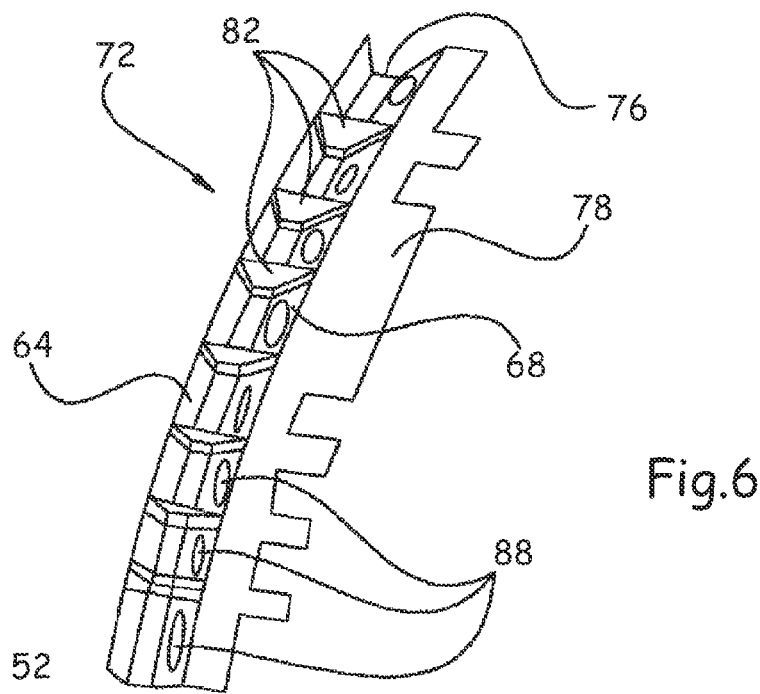
FIG. 6 is a perspective view that illustrates the interior of a reinforcement that forms the edge of the door frame illustrated in FIG. 5.

The first part 72 of the box shape is illustrated in detail in FIGS. 5 and 6. It consists of a plate that has a cross-section with a first face forming the first wall 64, a second face 76 that is essentially perpendicular to the first face, a third face forming the inclined wall 68, and a fourth face 78 that is used as a support surface for the second part 74 and optionally the skin 42 of the fuselage.

This first part 72 of the box shape comprises reinforcements for preventing the faces from folding. Thus, the first part 72 of the box shape comprises a first series of ribs 80 arranged perpendicular to the surface that is oriented toward the inside of the aircraft of the third and fourth faces and a second series of ribs 82 arranged perpendicular to the surface that is oriented toward the exterior of the aircraft of the first, second, and third faces.

The ribs 80 and 82 only comprise dropped edges at the level of the edges in contact with the first part 72.

Preferably, the ribs 80 and 82 are arranged facing the door stops 56.

The second part 74 of the box shape has a plate shape and constitutes a part of the skin of the fuselage of the aircraft.

To ensure the connection between the two parts 72 and 74, it is possible to provide an angle bar 84 for providing the connection between the second part 74 and the first face that forms the first wall 64 of the first part 72, with the second part 74 being flattened against the fourth face 78. This angle bar 84 performs the function of a fusible part and helps to simplify the docking between the two parts 72 and 74 of the box shape.

Preferably, the ribs 82 have suitable dimensions for leaving a space 86 between said nerves 82 and the second part 74, as illustrated in FIG. 5, so that said ribs 82 do not interfere with said second part 74 during the assembly of the two parts 72 and 74 of the box shape.

According to another advantage, the reason is that the second part 74 that forms the skin of the fuselage at the frame is in contact only at the angle bar 84, and the fourth face 78 makes it possible to track the zones of thickness variation (for example because of loosening folds) in zones that are not used as support to another part, in particular the first part 72 of the box shape.

Advantageously, the inclined wall 68 comprises holes 88 for allowing access inside the box shape, for allowing, for example, access to the attachments of stops 56 and optional thrust rings 90.

The production in composite material of the first part 72 of the box shape is simplified and does not require a complex device because the ribs 80 and 82 do not comprise chords in contact with the skin that forms undercuts.

In addition, the fact of eliminating these chords makes it possible to simplify the docking between the two parts 72 and 74 of the box shape.

Figure 7:
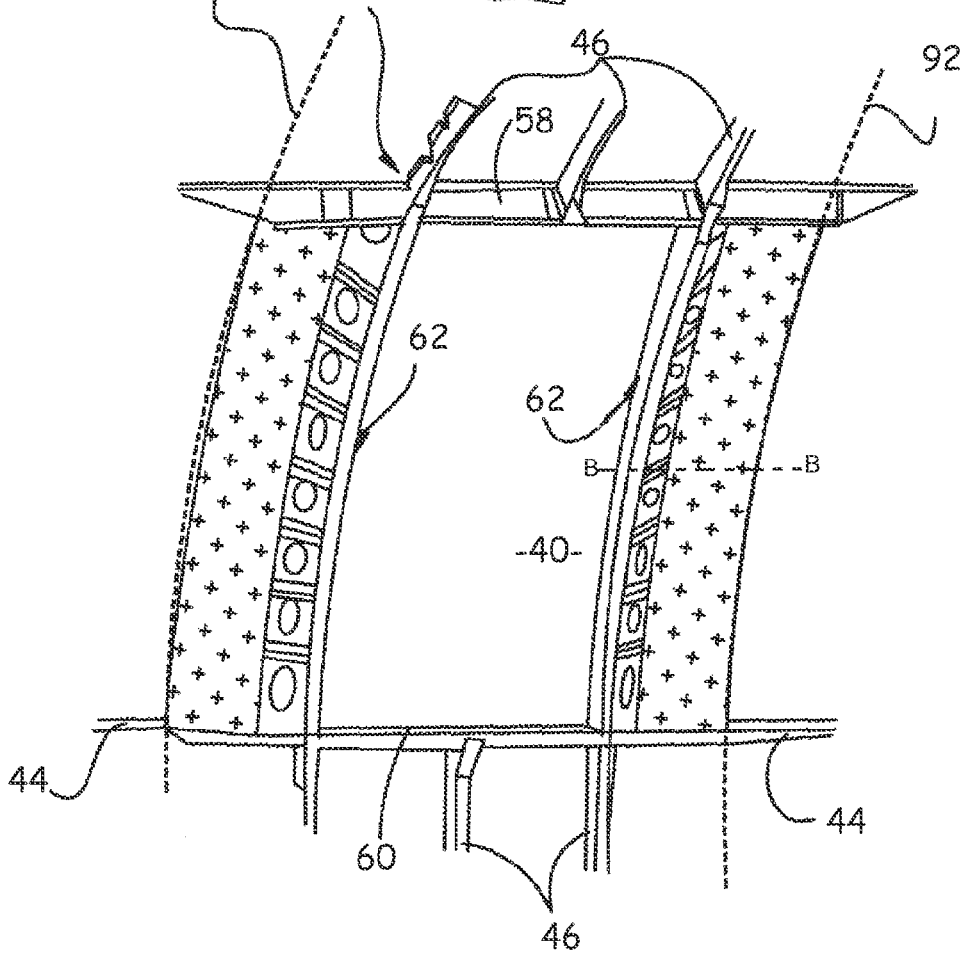
FIG. 7 is a perspective view of a door frame according to the invention that illustrates the saving of space relative to a solution of the prior art.
Figure 8:
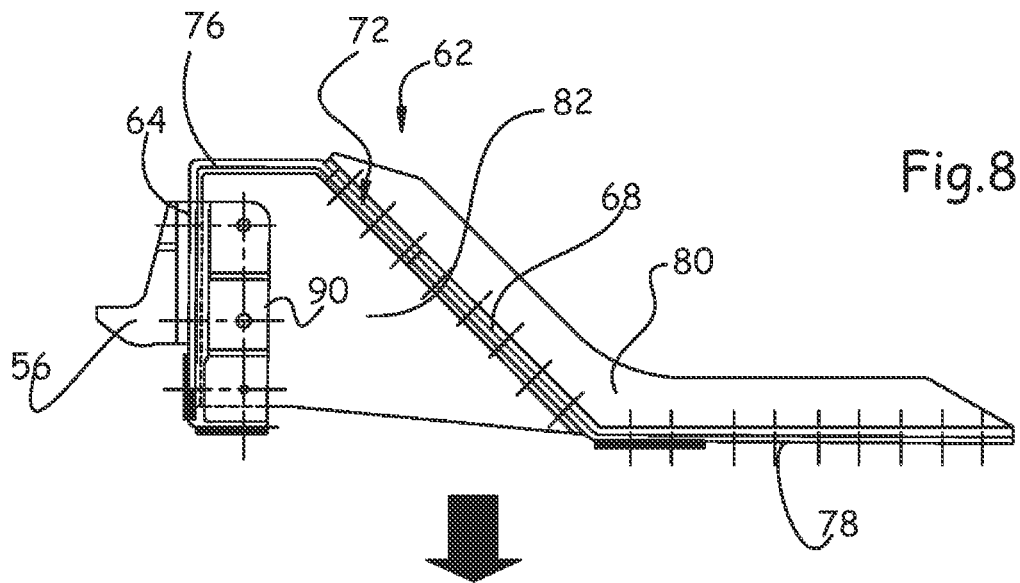
FIG. 8 is a cutaway, along line B-B of FIG. 7, which illustrates one of the two parts that form an edge of a door frame according to the invention, before assembly.
Figure 9:
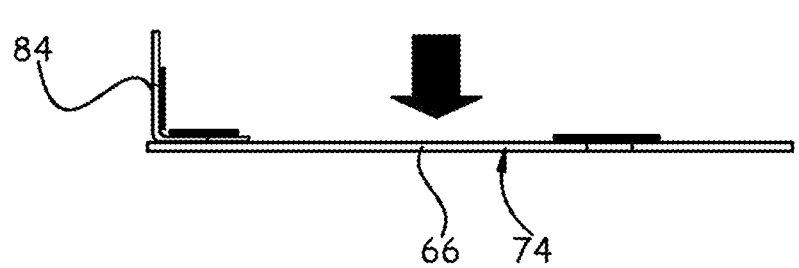
FIG. 9 is a cutaway, along line B-B of FIG. 7, which illustrates one of the two parts that form an edge of a door frame according to the invention, before assembly.

According to another advantage, this box shape makes it possible to reduce the space requirement of the door frame as illustrated in FIG. 7, in particular when the opening is provided in fuselage zones that have a quasi-cylindrical shape.

In these zones, the fuselage comprises a structure that consists of stringers and frames that are uniformly and constantly spaced apart over the entire zone. When the opening has a width that is essentially equal to two frame spans, as illustrated in FIG. 7, the frame with a box shape makes it possible to reduce the space requirement of the inner frame by 50% relative to a ladder-shaped structure of the prior art whose limits are indicated by the dotted lines 92.

According to another advantage, this box shape simplifies the connection between the door frame and the rest of the fuselage.

Advantageously, as illustrated in FIG. 5, the first part 72 of the box shape, and more particularly the fourth face 78, can provide the splice function and extend beyond the second part 74 in such a way as to offer a single plane of installation for the second part 74 that forms the skin of the fuselage at the frame and for the skin 42 of the fuselage. This solution reduces the number of parts.

According to another aspect, the substructure in box shape simplifies the docking of the frame with the rest of the fuselage because of the presence of a single plane of installation contrary to the solutions of the prior art that comprise several planes of installation because of the dropped edges of the intercostal ribs and stiffeners in contact with the skin.

The invention claimed is:

1. A door frame provided at an opening made in a fuselage of an aircraft that is delimited by a skin, said door frame comprising:
   an upper longitudinal stiffener and a lower longitudinal stiffener;
   two vertical substructures connected by said upper and lower longitudinal stiffeners, each of said vertical substructures being arranged on a respective opposite side of the opening; and
   at least one stop provided at a level of the opening that uptakes radial forces exerted by the door;
   wherein each vertical substructure has a structure made of composite material with a first wall, a second wall that is connected to the first wall, and arranged essentially perpendicular to the first wall, and a third inclined wall that connects the first wall and the second wall in such a way as to obtain a box substructure having a closed and hollow cross-section in a sectional plane perpendicular to a vertical extent of the vertical substructure,
   wherein the first wall forms an edge of the opening, and the second wall is configured to be arranged in the plane of the skin of the fuselage.

2. The door frame according to claim 1, wherein one of said three walls is a part of the skin of the aircraft fuselage.

3. The door frame according to claim 1, wherein each box substructure comprises a first part that can form a closed cavity with the skin of the fuselage.

4. The door frame according to claim 3, wherein the first part of the box substructure consists of the first wall, the third inclined wall, and a support surface for the skin of the fuselage,
   wherein said third inclined wall comprises a flat portion that is essentially perpendicular to the first wall.

5. The door frame according to claim 4, wherein an interior of the first part of the box substructure comprises a series of interior ribs perpendicular to the third inclined wall.

6. The door frame according to claim 5, wherein there is a space between the interior ribs and the skin of the fuselage.

7. The door frame according to claim 4, wherein an exterior of the first part of the box substructure comprises a series of exterior ribs that are arranged perpendicular to the third inclined wall.

8. The door frame according to claim 4, wherein each box substructure comprises an angle bar for providing a connection between the first wall and the skin of the fuselage.

9. The door frame according to claim 3, wherein the third inclined wall of each box substructure comprises holes for allowing access to an interior of the box substructure.

10. The door frame according to claim 3, wherein each box substructure further comprises a second part that is arranged in the plane of the skin of the fuselage, with the first part comprising a support surface that performs a splice function and that offers a single plane of installation in said second part and in the rest of the skin of the fuselage.

11. The door frame according to claim 5, wherein an exterior of the first part of the box substructure comprises a series of exterior ribs that are arranged perpendicular to the third inclined wall.

12. The door frame according to claim 5, wherein each box substructure comprises an angle bar for providing a connection between the first wall and the skin of the fuselage.

13. The door frame according to claim 4, wherein the third inclined wall of each box substructure comprises holes for allowing access to the interior of the box substructure.

14. The door frame according to claim 4, wherein each box substructure further comprises a second part that is arranged in the plane of the skin of the fuselage, with the first part comprising the support surface that performs a splice function and that offers a single plane of installation in said second part and in the rest of the skin of the fuselage.

* * * * *